Nov. 12, 1968   J. C. ESCOTT   3,410,224
TRACK-MOUNTED DEVICES FOR INFLUENCING
THE SPEED OF RAILWAY VEHICLES
Filed May 22, 1967

INVENTOR
JOHN C. ESCOTT
ATTORNEYS

United States Patent Office 3,410,224
Patented Nov. 12, 1968

3,410,224
TRACK-MOUNTED DEVICES FOR INFLUENCING THE SPEED OF RAILWAY VEHICLES
John Charles Escott, Cheltenham, England, assignor to Dowty Mining Equipment Limited, Tewksbury, Gloucester County, England, a British company
Filed May 22, 1967, Ser. No. 640,294
Claims priority, application Great Britain, June 15, 1966, 26,647/66
5 Claims. (Cl. 104—162)

ABSTRACT OF THE DISCLOSURE

A fluid-operated telescopic device for exerting a speed-influencing force on a wheel of a railway vehicle, comprises a cylinder member which is fixed to a rail along which the wheel rolls, and a vertically movable piston member which acts against the flange of the wheel through the intermediary of a slidably guided head member, said head member serving substantially to relieve the piston member from the transverse component of wheel force.

BACKGROUND OF THE INVENTION (1) *Field of the invention*

Telescopic devices fixed to a railway track and operable by fluid pressure control to influence the speed of railway vehicles.

(2) *Description of the prior art*

United States specification Patent No. 3,040,676 discloses a fluid-operated telescopic device having a cylinder fixed vertically adjacent to a rail, a piston which is slidable in the cylinder and which has a head engageable by the periphery of a railway vehicle wheel whereby the piston moves downwardly and then upwardly when the wheel rolls over the device, and a speed-sensing valve which controls the fluid pressure in the telescopic device during downward and upward movements of the piston whereby fast moving vehicles are retarded. In another embodiment, the speed-sensing valve controls the connection of an external high pressure supply and a low pressure supply whereby the piston exerts a retarding force against a fast moving wheel, and an accelerating force against a slow moving wheel.

The initial engagement of the wheel with the piston head is in the nature of an impact which is all the more severe at high vehicle speeds. This impact has a vertical component of force which starts to depress the piston, but it also has a transverse component of force which applies a bending moment to the piston.

SUMMARY

According to the present invention, a device for exerting a speed-influencing force on a wheel of a railway vehicle, comprises two fluid-operated telescopic members of which one telescopic member is arranged to be fixed adjacent to a track rail so that the other telescopic member is movable in a generally vertical direction, guide surfaces formed on the fixed telescopic member parallel to the direction of movement of the movable telescopic member, and a head member guided by said guide surfaces, the head member having abutting engagement with the upper end of the movable telescopic member, and being engageable by a vehicle wheel rolling along the rail so as to transmit the downward component of wheel force to the movable telescopic member, but to transmit the transverse component of wheel force substantially to the guide surfaces.

DESCRIPTION OF THE PREFERRED EMBODIMENTS

Figure 1:
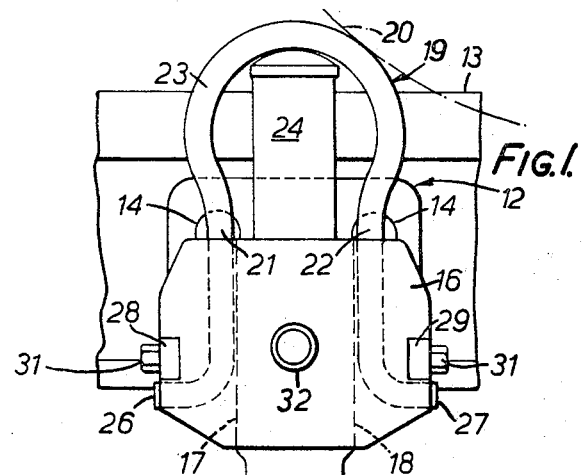
FIGURE 1 is an elevation view of a fluid-operated telescopic device seen in a direction perpendicular to a rail against which the device is mounted.
Figure 2:
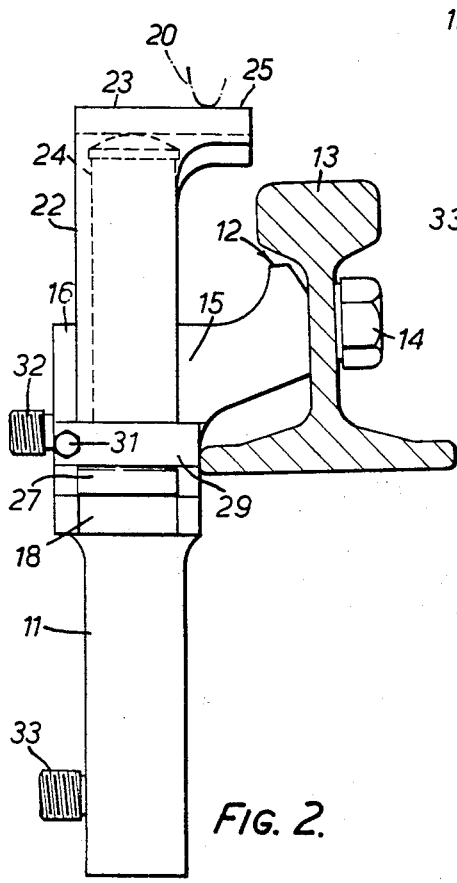
FIGURE 2 is an elevation view in a direction perpendicular to that of FIGURE 1.

In the device of FIGURES 1 and 2 a cylindrical telescopic member 11 is provided having an enlarged upper portion formed as a mounting bracket 12 which is fixed to a rail 13 by a pair of bolt fastenings 14 so that the cylinder is disposed generally vertically and adjacent to the rail. The enlarged upper portion includes a pair of plate members 15, 16 which are spaced laterally from the rail 13, and a pair of parallel planar surfaces 17, 18 which lie in vertical planes transverse to the length of the rail on opposite sides of the fixed member 11. These planar surfaces 17, 18 together with the plate members 15, 16 form a pair of vertical rectangular-sectioned channels which provide guide surfaces for the parallel sides of an inverted U-shaped head member 19. The sides 21, 22 of the head member 19, which is formed of resilient strip material having a rectangular cross-section similar to that of the channels, slide over the surfaces 17, 18 and between the plate members 15, 16, so that the head member 19 is guided for downward and upward movement in a generally vertical direction without turning about the central axis of the cylinder member 11.

The base 23 of the U unites the parallel sides 21, 22 and abuts the upper end of a piston 24, forming the other telescopic member, which is movable in a generally vertical direction in the cylinder member 11. The base 23 has a transverse extension 25 which, in the uppermost position of the piston 24, lies above the rail 13 and which, in the lowermost position of the piston 24 lies below the upper surface of the rail. The extension 25 is engageable by the flange of a vehicle wheel which rolls along the rail so that the piston is depressed from and returns to its upper position during the time that the rolling wheel is in contact with the head member.

The uppermost position of the head member 23, and therefore, the uppermost position of the piston 24, is determined by end portions 26, 27 of the sides of the U which are outturned in opposite directions to co-operate with stop bars 28, 29. These stop bars are located in and secured to the plate members 15, 16 by fastening bolts 31.

The device may be either a speed retarder or a speed booster, or a single device capable of performing the former function if the vehicle is moving faster than a predetermined speed, and the latter function if the vehicle is moving slower than a predetermined speed. The retarding function is accomplished in known manner by fluid pressure resistance to downward movement of the piston 24, and the boosting function is accomplished in known manner by fluid pressure moving the piston upwardly with substantial force.

The device shown in FIGURES 1 and 2 is of the kind which is capable of speed retarding and speed boosting, and it includes a connector 32 for a low hydraulic pressure supply and a connector 33 for a high hydraulic pressure supply.

Figure 3:
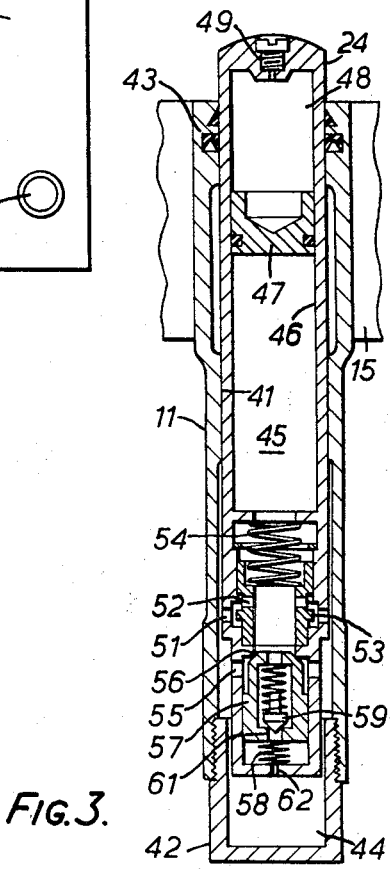
FIGURE 3 is a sectional view along the central axis of one form of fluid-operated telescopic device.

FIGURE 3 illustrates partly diagrammatically a selfcontained telescopic device capable of speed retarding only, which may be used in conjunction with the invention. The cylinder 11 has a bore 41 in which the piston 24 slides. The cylinder is closed at its lower end by a plug 42, while its upper end houses a sealing ring assembly 43 acting against the piston. The piston 22 and the cylinder 11 define a variable volume chamber 44 from which hydraulic fluid is discharged during downward piston movement into a reservoir 45 in the piston 22, and into which hydraulic fluid enters during upward movement of the piston from the reservoir 45. The latter has a bore 46 receiving a separator piston 47 above which is a gas-filled chamber 48 which can be charged through an inflation valve 49 from an external source.

One connection between the chambers 44 and 45 is provided by radial holes 51 in the piston and radial holes 52 in a flow-sensitive valve element 53. This element 53 is normally held in the valve-open position by a spring 54, but it closes against spring load when a predetermined pressure difference across the radial holes 52 is exceeded.

A second connection between the chamber 44 and the reservoir 45 is provided by a servo relief valve which comprises a main valve having radial entry holes 55 to a valve seat 56 which is normally closed by a main valve member 57 under the load of a spring 58. A spring-loaded pilot relief valve member 59 normally rests against a valve seat 61 to close a flow path through a restricting orifice 62 in the lower end of the piston 22 and through the main valve member 57 to the reservoir 45.

The flow-sensitive valve 53 closes upon a rapid downward movement of the piston 22, the pilot relief valve 59 opens, and the resulting fall of pressure above the orifice 62 on the lower end of the main valve member 57, allows the main valve to open. The main valve restricts the flow across the valve seat 56 whereby there is substantial fluid pressure resistance to downward movement of the piston 22.

When the piston 22 starts to rise after its downward stroke, hydraulic fluid can return to the chamber 44 through the flow-sensitive valve 53 which opens under the load of the spring 54, and through the servo-relief valve 56, 57 which then operates as a low pressure non-return valve. The pressure of gas in the chamber 48 is sufficient to ensure extension of the piston 22 without exerting any substantial force on the vehicle wheel.

If the piston 24 is moved downwardly by a slowly moving vehicle wheel, the fluid pressure across the radial holes 52 is not sufficient to close the flow sensitive valve 53. Piston movement is then only resisted by the gas pressure in the chamber 48 without exerting any substantial retarding effect on the vehicle wheel. Subsequent upward movement of the piston 24 takes place with return fluid flow through the flow-sensitive valve 53 and the servo-relief valve 56, 57.

The function of the head member 19 will now be described. When a vehicle wheel approaches the device, the flange 20 of the wheel engages the transverse extension 25 obliquely. The impact force of the initial engagement has a vertical component which forces the piston 24 downwardly in the cylinder, and it also has a horizontal component in a direction parallel to the rail and offset from the central axis of the telescopic device. The horizontal component of the impact force and the subsequent wheel load causes the head member 19 to yield resiliently, but this horizontal load component is substantially sustained by pressure between the sides 21, 22 and the guide surfaces 17, 18. During yielding movement of the head member 19, the frictional engagement of the base 23 with the upper end of the piston 24 will in fact apply a bending moment to the piston, but this is small compared with that which would occur if the wheel engaged a head member fixed rigidly to the piston 24. The yielding movement of the head member also cushions the high initial forces on the piston in the vertical direction.

The wheel force is only at one instant in a vertical direction parallel to the central axis of the telescopic device, i.e., when the centre of the wheel is vertically over the device.

At the end of the subsequent upward movement of the piston 24, the wheel flange 20 leaves the head member 19 when the end portions 27, 28 engage the stops 28, 29. The formation of the head member allows resilient yielding to take place under the load of the piston 24 against the base 23, whereby the termination of upward piston movement is cushioned.

Since the main resistance to the horizontal component is provided by the head member 19, the wall thickness of the upper part of the piston 24 may be kept small in order to provide the maximum total volume of the reservoir chamber 45 and the gas-loaded chamber 48, FIGURE 2. It is also of advantage to provide a thin-walled piston 24 in the embodiment of FIGURES 1 and 2 for accommodating a suitable flow-sensitive valve.

I claim as my invention:

1. A device for exerting a speed-influencing force on a wheel of a railway vehicle, comprising two fluid-operated telescopic members of which one telescopic member is arranged to be fixed adjacent to a track rail so that the other telescopic member is movable in a generally vertical direction, guide surfaces formed on the fixed telescopic member parallel to the direction of movement of the movable telescopic member, and a head member guided by said guide surfaces, the head member having abutting engagement with the upper end of the movable telescopic member, and being engageable by a vehicle wheel rolling along the rail so as to transmit the downward component of wheel force to the movable telescopic member, but to transmit the transverse component of wheel force substantially to the guide surfaces.

2. A device according to claim 1, wherein that portion at least of the head member which extends between the upper end of the movable telescopic member and the guide surfaces is resilient so as to be resiliently yieldable under the transverse component of wheel force.

3. A device according to claim 2 wherein the head member is formed of resilient strip material having generally the shape of an inverted letter U, in which the sides of the U are parallel and engage the guide surfaces which are formed on opposite sides of the fixed telescopic member, while the base of the U which unites the parallel sides abuts the upper end of the movable telescopic member.

4. A device according to claim 3 wherein the end portions of the sides of the U are outturned in opposite directions to co-operate with stops provided on the fixed telescopic member, for determining the uppermost position of the head member.

5. A device according to claim 1 wherein the fixed telescopic member comprises a cylinder in which the movable telescopic member is slidable, the cylinder having an enlarged upper portion which forms a mounting bracket adapted for fixing to the rail, and which includes said guide surfaces.

References Cited

UNITED STATES PATENTS

| | | | |
|---|---|---|---|
| 3,040,676 | 6/1962 | Checkley | 104—162 |
| 3,148,633 | 9/1964 | Bick | 104—162 |
| 3,373,699 | 3/1968 | Bick | 104—162 |

ARTHUR L. LA POINT, *Primary Examiner.*

D. W. WORTH, *Assistant Examiner.*